INVENTOR
Edward Cecil Woodcock
ATTORNEY

Dec. 15, 1959  E. C. WOODCOCK  2,916,979
PHOTOGRAPHIC SHUTTERS
Filed March 24, 1955  4 Sheets-Sheet 2
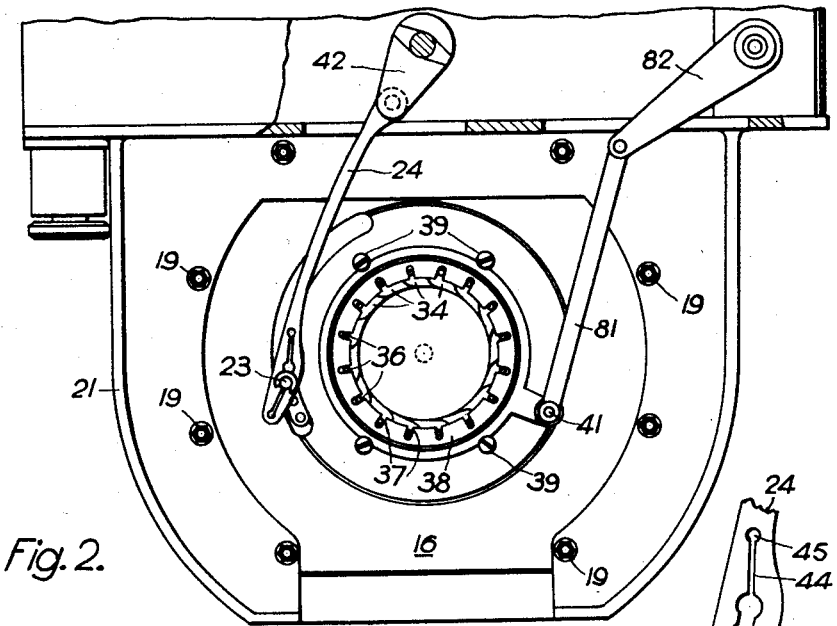
Fig. 2.
Fig. 3.
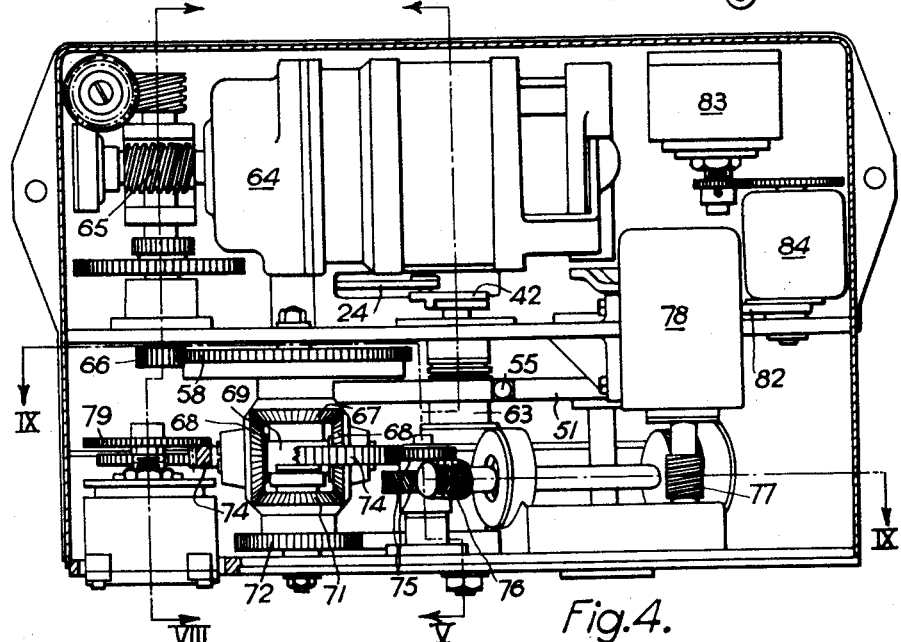
Fig. 4.
INVENTOR
Edward Cecil Woodcock
BY G. T. Odell
ATTORNEY INVENTOR
Edward Cecil Woodcock
BY *[signature]*
ATTORNEY Dec. 15, 1959 E. C. WOODCOCK 2,916,979
PHOTOGRAPHIC SHUTTERS
Filed March 24, 1955 4 Sheets-Sheet 4

INVENTOR
Edward Cecil Woodcock
BY
ATTORNEY

United States Patent Office 2,916,979
Patented Dec. 15, 1959

2,916,979

PHOTOGRAPHIC SHUTTERS

Edward Cecil Woodcock, Pinner, England, assignor to Williamson Manufacturing Company Limited, London, England Application March 24, 1955, Serial No. 496,383

12 Claims. (Cl. 95—63)

This invention relates to photographic shutters and its object is to provide a shutter which will work satisfactorily at high speeds while having a large aperture. The terms "high speed" and "large aperture" are, of course, relative, but to give an example, a shutter to give an exposure down to a 1/500 second and controlling an aperture of 1¾ inch diameter represents the sort of values which are contemplated. The construction of such a shutter presents serious mechanical problems in several directions and the invention provides advantageous ways of dealing with these problems.

One aspect of the invention concerns shutters of the type in which the or each obturating element is a blade executing a pivotal motion and shutters of this type are commonly used as between lens shutters. At high speed wear of the pins on which the blades are usually mounted gives rise to difficulties and so also does the attachment of the pins to the blades. According to the present invention the pins are eliminated by carrying each blade on a planetary member which during the operation of the shutter is both rotated and translated. The translatory movement will usually be on a circular path consequent upon the planetary motion. In itself this motion has no particular advantage or disadvantage in relation to the motion of the blade, and it can be kept short by suitably proportioning the parts of the planetary gearing. Thus, the planetary members may be pinions meshing with an internally and an externally toothed ring, one of which, conveniently the inner ring, remains stationary and the other of which is rotated to effect the movement of the planetary members, and hence of the blades. The nearer the relative diameters of the toothed rings approach to unity the smaller will be the translatory, i.e., planetary movement for a given angular rotation of the blade. With this arrangement, the angular movement of the moving ring for a given angle of rotation of the blades will be twice as great as in the case of a blade pivoted on a stationary axis and engaged at the same radius, but the load on the pinion teeth will be reduced in a like measure and there is no particular difficulty in providing an adequate angular movement of the moving ring.

It will be understood that this aspect of the invention is equally applicable to a shutter using only a single blade as to a shutter using a plurality of blades. The choice of one, two, or a greater number of blades will be determined by the particular considerations arising in any particular case. These considerations are known to those skilled in the art. Also the blades may move from a closed to an open position and back, or from a closed position through an open position to another closed position.

Another problem presented by high speed shutters is the bringing of the obturating members of the shutter to rest without undue shock due to inertia loads. To deal with this problem according to the invention the mechanism by which the movement of the obturating mechanism is conveyed from the energy source includes a coupling which when the load exceeds a predetermined value releases but also applies a substantial resistance to relative motion of the two parts. Thus, when the side of the coupling which is attached to the energy source is brought to rest the obturating members can continue in movement until brought to rest by the resistance opposing the resulting relative motion of the two parts of the coupling. The resistance could be provided by a dashpot or like fluid controlled device, but it is usually difficult to accommodate means giving a resistance of this kind and instead a frictional resistance may be employed.

A particular construction comprises a pin forming one part of the coupling and an apertured link forming the other part, the aperture being extended by a slot of slightly smaller width than the diameter of the pin and the sides of the link where it is slotted being sufficiently resilient to enable the pin to spread the sides of the link and move along the slot; to avoid excessive stresses when the pin first enters the slot, the slot may be continued from the opposite side of the aperture to that beyond which the pin moves. This extension on the opposite side can, of course, be narrower than the slot into which the pin moves and at its remote end it may terminate in a circular hole to reduce the risk of fatigue cracks. To keep wear at low value, the pin and link may be of hardened steel.

Such a link can conveniently be used in a shutter of the type in which successive movements of the link in opposite directions produce successive exposures. In that case, the slot along which the pin moves may have a full diameter aperture at each end and this full diameter aperture may be continued on the other side by a narrow slot to avoid excessive stresses as above described. A shutter having blades with a planetary mounting as described above can easily be arranged so that the blades rock in opposite directions alternately at each successive exposure. In itself, a shutter so arranged is well-known and merely requires a form of blade which with a single aperture has a portion on each side of the aperture wide enough to obturate the aperture or the appropriate part of the aperture which the shutter controls. This type of shutter is usually used close to the camera lens, generally within the lens as near as possible to the location of the stop as the aperture here is the smallest anywhere in the whole optical system from the object to the image.

When this aspect of the invention is applied to a shutter in which successive exposures are effected by alternate movement of the link in opposite directions, the shutter is conveniently operated by successive half revolutions of a crank, the connecting rod then constituting the link with an aperture at each end of the slot. The parts should be so proportioned that the pin just travels from one aperture to the other at the highest shutter speeds. Then at lower speeds it may not travel the whole way, but this is not important if the parts are so proportioned that the shutter will close even if the pin does not leave the aperture at all.

Such a crank mechanism is commonly actuated by winding up a spring which drives the crank and controlling the crank by an escapement which permits it to rotate through half a revolution at a time. The crank is therefore brought very violently to rest when it is checked by the escapement, and a further development of the invention consists in the provision of a braking mechanism which comes into operation after the crank has been released, but before it comes to rest. With an escapement in the form of a rocking lever having two abutments coacting with an escape tooth, the tooth may be formed on a part circular projection and there may be a braking surface adjacent each abutment which coacts with the part circular projection.

A still further development is concerned with the winding of the spring in a mechanism of this kind. It is difficult to arrange such a spring to cover a large range of exposure. To make better provision, the invention makes use of two springs in parallel, one comparatively light for low speeds and the other comparatively heavy for high speeds. The light spring is always in action but a predetermined amount of lost motion is provided in the winding of the heavy spring e.g. a slot covering say 180° in which one end of the spring is movable. Thus in winding up from a condition of no tension, winding of the light spring starts at once, while winding of the heavy spring does not start until the lost motion has been taken up. During any further winding both springs are wound up together.

The invention will be further described with reference to the accompanying drawings which illustrate a complete example and a modification of certain parts.

Figures 1a and 1b are part plan views of a shutter embodying the present invention, Figure 1a having parts of the casing broken away and Figure 1b having parts in section and, Figure 2 is an underneath plan view of part of Figures 1a and 1b with part of the casing in section, Figure 3 is a detail of part of Figure 2, Figure 4 is an elevation with the casing in section and with parts below the plane indicated by the line IV—IV of Figure 1b removed.

Figures 1a and 1b are on a smaller scale than most of the other views and Figures 3, 6 and 7 are on a larger scale.

Figure 1A:
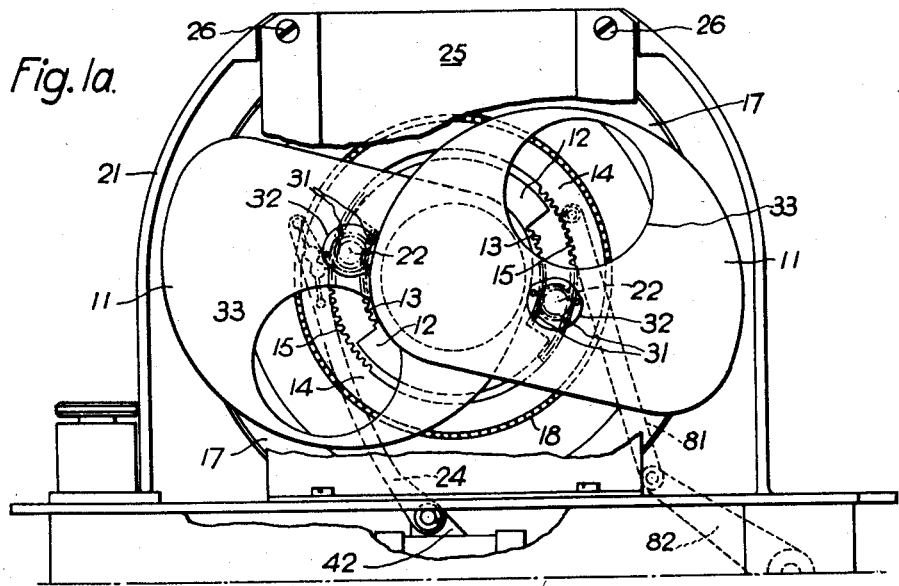

The example illustrated in Figs. 1 to 8 has two blades 11. There is a fixed inner ring 12 which might be toothed all round but is here only toothed over two opposite arcs of sufficient length, indicated at 13, and there is an outer ring 14 having internal teeth which might extend all round but here only toothed over two opposite arcs at 15 of sufficient length. The inner ring 12 is here fixed to a thin cover plate 16, Figure 2, while the outer ring 14 is journalled in a fixed bearing ring 17, which is also secured to the cover plate 16. Desirably, as shown, the moving ring 14 is journalled by bearing balls 18 running in angle section races in the periphery of the moving ring 14 and the fixed bearing ring 17. To permit the races to be filled with balls, one of the rings, here the ring 17, is built up of two thicknesses which are secured together after the balls 18 have been introduced (see Figure 7). The assembly of the cover plate 16 and rings 12 and 17 is secured by screws 19 to a frame 21. The two shutter blades 11 each carry a pinion 22 which meshes between the teeth of the rings 12 and 14. The ring 14 carries a pin 23 (Figure 7) projecting axially, in this example through the cover plate 16, and this is engaged by a link 24, the other end of which engages a crank pin as will be described below.

Figure 5:
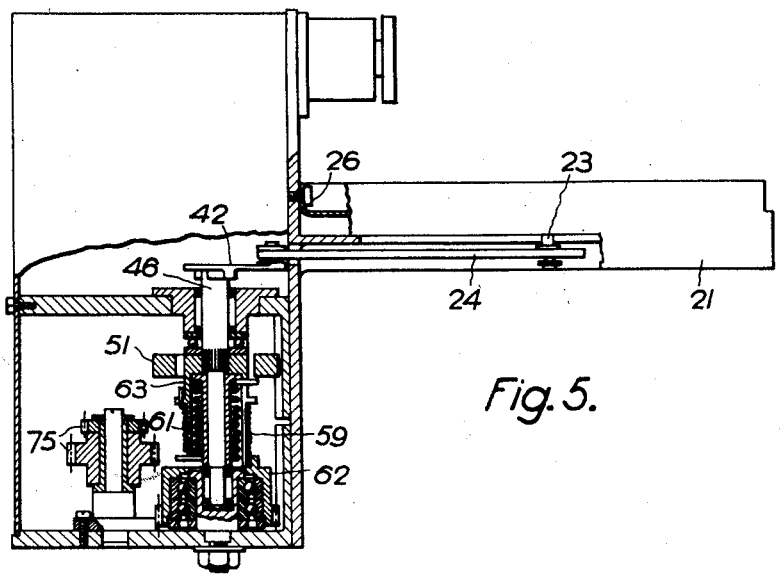
Figure 5 is an elevation partly in section on the line V—V of Figure 4.
Figure 6:
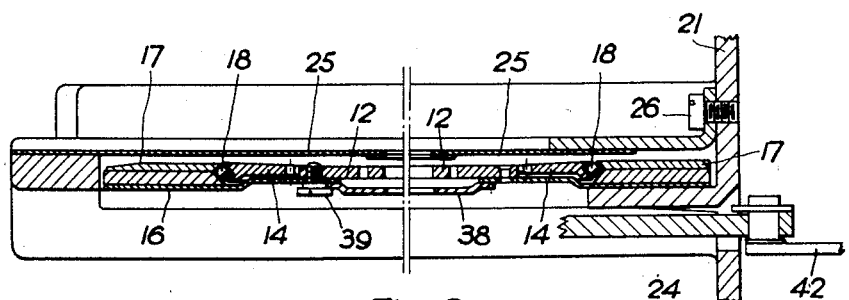
Figure 6 is a detail cross section of Figure 5.
Figure 7:
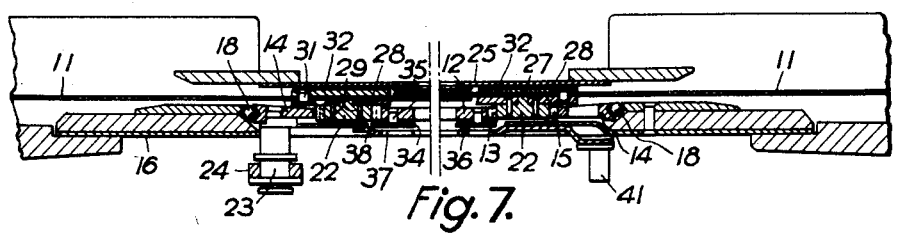
Figure 7 is a similar view of Figure 6 but taken at right angles thereto.

A second cover plate 25 covers all these parts, and is held by screws 26 visible in Figs. 1a and 5 screwing into the frame 21. If this cover plate is removed, the shutter blades with their pinions can be lifted out and exchanged if desired. Both cover plates 16, 25, are apertured at the centre to permit the passage of light. The toothed rings 12, 14, and pinions 22 may be of hardened steel or case hardened mild steel and the shutter blades 11 of thin spring steel, while the frame 21 may be of light alloy.

To secure the pinions 22 to the blades 11, each pinion may have a diametral rib 27 (Fig. 7) across one end which fits into a flange 28 of larger diameter. The pinion is held to the flange by a couple of rivets 29 and the flange itself is secured by rivets 31 to another flange 32 with the blade 11 sandwiched between the two flanges 28, 32. The rivets 29 holding the pinion to the flange are necessarily within the root circle of the pinion teeth in order to leave the pinion teeth clear for meshing with the rings 12, 14. They would therefore not be at a good radius to transmit the operating loads, but owing to the provision of the rib 27 in fact they do not transmit any of the operating loads, while the rivets 31 between the two flanges which do transmit the loads are at a much greater radius than the rivets 29 through the pinion. If desired, the rib could extend through a slot in the blade and another slot in the second flange.

Each of the two blades 11 has a single central aperture 33 equal in size to the aperture to be controlled, and owing to the symmetrical layout the shutter is effective in either direction of rotation. A single blade of suitable shape, i.e., large enough opposite the aperture 33 to obturate the aperture to be controlled could be used, but as compared with one blade the shutter with two blades is balanced and the exposure is half that which would be obtained with a single blade with the same operating speed.

A shutter constructed in this way has the advantage not only of simplicity but also, as can be seen in the drawings, that it can be made of very small axial thickness. It will further be seen in Figs. 6 and 7 that there is a recess within the diameter of the ball races. Use is made of this recess to accommodate iris diaphragm leaves 34 having pivot pins 35 at one end pivoted in holes in the inner ring 12, and operating pins 36 at the other end working in the usual radial slots 37 (see also Figure 2) in an adjusting ring 38 which is here centred and retained by screws 39. A pin 41 projecting from the ring 38 serves for transmitting the adjusting movement, if desired from any convenient remote point.

The mechanism for operating the shutter includes a crank 42, Figure 2, coupled by the link 24 to the pin 23. The crank 42 is rotated half a revolution at a time by means described below, and at each such half rotation moves the outer ring 14 through an angle adequate to rotate the shutter blades 11 through one revolution. The pin 23 engages in a slot 43 in the link (see Fig. 3), this slot having two end portions of the same diameter as the pin 23 joined by a part of somewhat less width, and this part of the link is made resilient by two further slots 44 terminating in round holes 45 to reduce the likelihood of fatigue cracks being started. From the position shown in Fig. 2 in which the pin 23 is at the right-hand end of the slot 43, the next half revolution of the crank 42 will carry the pin 23 to the left. At the end of the movement, the moving parts of the shutter will still have considerable kinetic energy due to their inertia and the pin 23 will spring the sides of the slot 43 apart and move towards the other end of the slot. The parts should be so proportioned that the pin will reach the other end of the slot at a speed approaching the highest. At lower speeds, if it does not reach the other end of the slot this is not of great importance. The length of the slot is made such in relation to the total movement of the link that even if the pin does not move along the slot at all the shutter will have reached its closed position. The resilient pressure of the sides of the slot on the pin 23 constitute a friction brake which damps down the movement and thus avoids excessive shock when the shutter closes.

Figure 9:
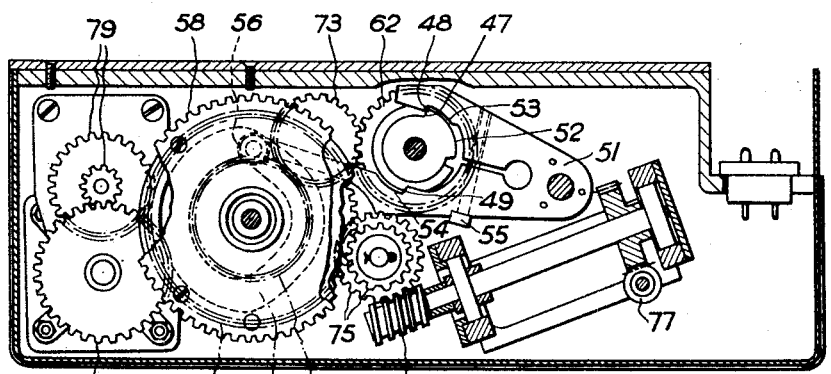
Figure 9 is a plan taken partly in section on the lines IX—IX of Figure 4.

The mechanism for rotating the crank includes a shaft 46 (see Figure 5) carrying the crank, to which a spring load is applied and carrying an escape tooth 47 with which coacts abutments 48, 49 on a rocking lever 51. In principle such an escapement is well-known. In Fig. 9 the tooth 47 is checked by the abutment 48, and the next movement of the lever will be clockwise, thus releasing the tooth 47 which will then be checked by the abutment 49. To lessen the blow of the tooth against the abutment, behind the tooth is provided a surface 52 concentric with the shaft 46, and the lever 51 has two corresponding braking surfaces 53, 54. Thus, at the next step from the position shown in Fig. 9 before the tooth 47 reaches the abutment 49, the surface 52 will come into engagement with the surface 54, thus braking the movement of the rotating parts a little before the tooth engages the abutment. The same will happen on the next movement when the surface 52 will engage the surface 53. To enable the precise degree of braking to be adjusted, the lever 51 is split and the two parts can be drawn together by a screw 55.

At slow shutter speeds the braking action may bring the crank to rest before the tooth 47 reaches the next abutment but owing to the relatively small length of the braking surfaces 53, 54 there is no risk of the crank coming to rest before the shutter has closed. Nor will there be any interference with the proper action at the next exposure because the very first succeeding movement of the rocking lever 51 will disengage that brake which is in action and the shaft 46 will immediately rotate until the tooth 47 engages the adjacent abutment before the lever has moved far enough to move this abutment out of the way of the tooth 47.

In the illustrated example the lever 51 is carried by a shaft journalled by rubber bushes and is rocked by the aid of a roller 56 working in a cam groove 57 formed in a wheel 58 which is part of the mechanism for winding the spring as will be explained below so that as long as the mechanism is in operation the spring is wound up and the shutter actuated at each half revolution of the wheel 58. It will be understood however that the invention is not limited in this way and that where preferred the lever 51 may be rocked by any other convenient control arranged to stop the winding-up movement when the parts are ready for the next exposure. Thus at the termination of each winding operation a contact may be opened which stops the winding motor or preferably deenergises an electromagnetic clutch by which the winding motor is coupled to the winding mechanism and then when the shutter is released by operation of the lever 51 the movement of the parts may close the contact thus causing the spring to be wound again.

The spring loading of the shaft 46 is here arranged to enable a wide variation of load, and therefore a wide variation of exposure to be effected. To this end two springs 59, 61, in parallel are used, see Fig. 5, the spring 59 being a light spring and serving for low speeds and the spring 61 a heavy spring serving for high speeds. One end of the spring 59 is anchored to a rotatable sleeve 62 and the other end to a sleeve 63 fast on the shaft 46. Thus relative rotation between the sleeves 62 and 63 immediately winds up the spring 59. One end of the spring 61 lies in a cut-away part of the sleeve 62 so that it can freely rotate through 180° in relation to this sleeve while the other end is anchored to the sleeve 63. Thus starting from a position in which the spring 61 is under no load and its one end is at the loading end of the cut-away the two sleeves are rotated relatively through 180° before any winding up of the spring 61 takes place.

Figure 1B:
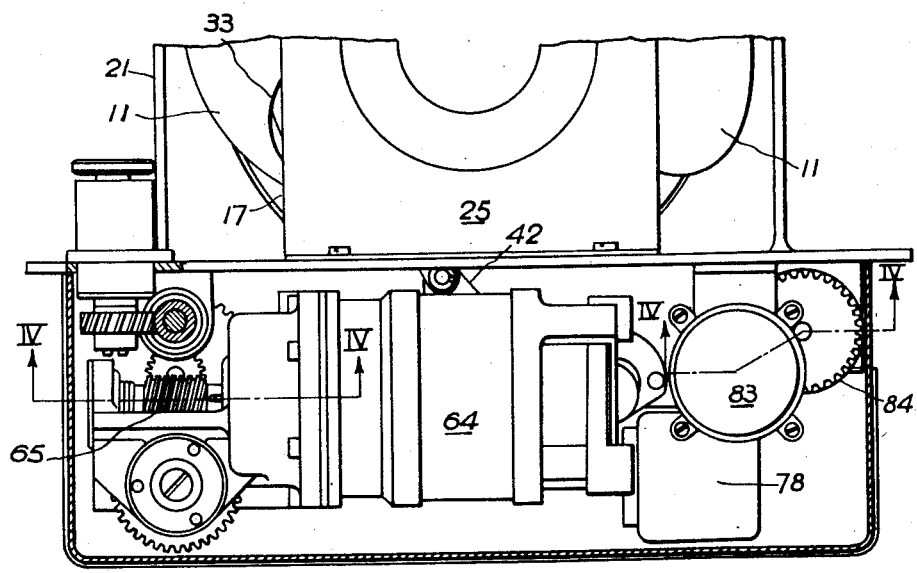

The winding of the springs is effected from an electric motor 64, Figure 4, which through worm gearing 65, Figure 1b and a pinion 66 rotates the wheel 58 with which is integral a bevel wheel 67. With the bevel wheel 67 mesh two further bevel wheels 68 borne on a spider and with which meshes another bevel wheel 71 integral with a gear wheel 72 which through an idler wheel 73, Figure 9, rotates the sleeve 62 which has gear teeth formed in its periphery.

Manifestly a drive will only be transmitted through the bevel gearing if the spider 69 remains stationary or under control. To this end the spider has fast to it a gear wheel 74 which can be held stationary or rotated by a train of gearing 75 and two stages of worm gearing 76, 77 driven by an electric motor 78. When the motor is stationary the worm gears lock the whole train while when the motor is rotated additional movements can be imparted to the wheel 72 beyond that imparted through the wheel 58. Thus by means of the motor 78 any degree of preloading can be applied to the springs while when the motor 78 is stationary, the action of the rest of the mechanism is to wind the spring up half a turn for each release of the shutter. It will be understood that starting from a position of no tension on the spring the first half revolution will only tension the light spring 59 while anything beyond half a revolution will tension both springs. Auxiliary gearing 79 is actuated from the wheel 74 to cooperate with remote indicating or controlling means such as a balanced potentiometer system so that the load applied to the springs can be indicated or controlled at a distance.

The illustrated example also provides for remote control of the iris diaphragm. To this end a link 81, Figure 2, couples the ring 38 to an arm 82. This arm can be rotated by an electric motor 83, Figure 4, through reducing gearing contained in a box 84 the final shaft which carries the arm 82. Any convenient remote system of control may be used such as a balanced potentiometer system.

Figure 10:
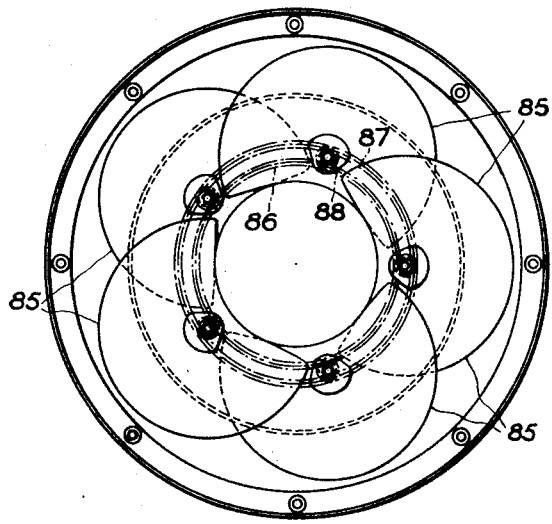
Figure 10 is a diagrammatic plan view of a modified arrangement.
Figure 8:
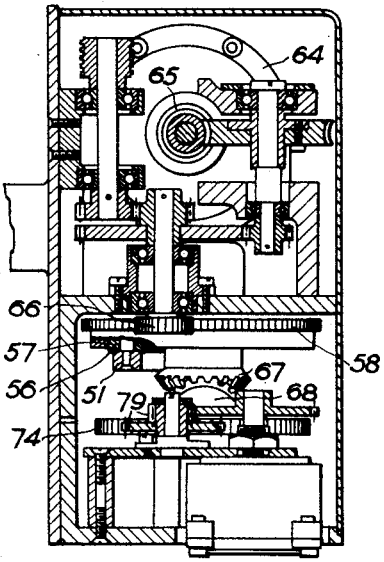
Figure 8 is an elevation partly in section on the lines VIII—VIII of Figure 4.

Figure 10 shows how the shutter may be constructed with a large number of blades, here five blades 85. The blades 85 do not need to be apertured since in the position shown they co-act to leave an aperture of circular form while obviously if they are rotated each through 180° in either direction the aperture will be obturated. The internally toothed ring is indicated at 87, the externally toothed ring at 86 and the planetary pinions at 88. The rest of the mechanism can obviously be as in the previous example.

I claim:

1. A photographic shutter comprising a supporting structure having an opening to provide a light path through it, a pivotless planetary member, means clear of the light path engaging opposite sides of said planetary member for translating it bodily in a path transverse in relation to but outside the light path and simultaneously rotating it on its own axis through a predetermined angle, and an obturating blade fast on said planetary member extending transverse to the light path and so shaped that the rotation of the planetary member through said predetermined angle moves the blade between two positions in one of which it obturates the light path to a substantially greater extent than in the other.

2. A photographic shutter as set forth in claim 1 in which in one of its positions the blade leaves the light path entirely unobstructed.

3. A photographic shutter as set forth in claim 1 in which in one of its positions the blade completely obturates the light path and in the other leaves the light path entirely unobstructed.

4. A photographic shutter comprising a supporting structure having an opening to provide a light path through it, a plurality of pivotless planetary members, inner and outer means clear of the light path respectively engaging all said planetary members on opposite sides for translating said members bodily each in a different path transverse in relation to but outside the light path and simultaneously rotating them each on its own axis through a predetermined angle, and an obturating blade fast on each said planetary member extending transverse to the light path and so shaped that rotation of the planetary members through the predetermined angle moves the blades between a position in which they leave the ligh path clear and a position in which the blades co-act to obturate the ligh path.

5. A photographic shutter comprising a supporting structure having an opening to provide a light path through it, an externally toothed ring surrounding said opening with its axis in the light path, an internally toothed ring of larger diameter than said externally toothed ring concentric with the latter, a pivotless pinion meshing with both said rings, an obturating blade carried by said pinion and extending transversely in relation to the light path, and means for relatively rotating said rings about their common axis through an angle such that the consequent motion of said pinion is sufficient to carry the blade between a position in which it leaves the light path unobstructed and a position in which it at least partially obturates the light path.

6. A photographic shutter as set forth in claim 5 including a plurality of pinions spaced apart between said rings, the blades being so shaped that in the second mentioned position they co-act to obturate the light path completely.

7. A photographic shutter as set forth in claim 6 wherein one toothed ring remains stationary and the other is rotatable through an angle adequate to operate the shutter.

8. A photographic shutter as set forth in claim 7 wherein the ring which remains stationary is the inner ring.

9. A photographic shutter as set forth in claim 5 wherein the means by which said blade is carried by said pinion comprises, a first flange attached to one end of said pinion by means within the root circle of the pinion teeth, a second flange, means securing said first and second flanges together with the blade between them, said last mentioned means being located outside the outermost diameter of the pinion and an integral rib on said pinion engaging in a slot extending at least through said first flange.

10. A photographic shutter comprising an apertured frame, an externally toothed ring fast on said frame and surrounding the aperture therein, an internally toothed ring rotatably mounted in said frame concentric with and surrounding said externally toothed ring, a plurality of pivotless pinions set between and meshing with both said rings but otherwise unsupported thereby to be rotated and bodily translated when said internally toothed ring is rotated, a shutter blade secured to each said pinion, said blades being shaped so that in one position of said internally toothed ring said blades coact to close the aperture in the frame and when said internally toothed ring is rotated through a determined angle the blades leave the aperture in the frame open, and means for rotating said internally toothed ring through said determined angle.

11. A photographic shutter as set forth in claim 10 wherein said blades are so shaped that on continued rotation of said internally toothed ring through a further angle approximately equal to said determined angle, the blades again coact to close the aperture in the frame.

12. A photographic shutter as set forth in claim 11 comprising two symmetrical blades each having a central aperture which is carried across the aperture in the frame, the blades being so disposed that their apertures register simultaneously with the aperture in the frame.

References Cited in the file of this patent

UNITED STATES PATENTS

| Number | Name | Date |
|---|---|---|
| 778,334 | Ricketts | Dec. 27, 1904 |
| 997,378 | Dietz | July 11, 1911 |
| 1,150,544 | Savage | Aug. 17, 1915 |
| 1,166,921 | McPhee | Jan. 4, 1916 |
| 1,325,317 | Fairchild | Dec. 16, 1919 |
| 1,488,523 | Wollensak | Apr. 1, 1924 |
| 1,856,308 | Barenyi | May 3, 1932 |
| 2,198,729 | Junghans | Apr. 30, 1940 |
| 2,211,355 | Stewart | Aug. 13, 1940 |
| 2,362,547 | Fuerst | Nov. 14, 1944 |
| 2,398,567 | Tranefors | Apr. 16, 1946 |
| 2,441,675 | Simmon et al. | May 18, 1948 |
| 2,525,099 | Kimble | Oct. 10, 1950 |
| 2,601,286 | Henry | June 24, 1952 |
| 2,662,457 | Fairbank | Dec. 15, 1953 |

FOREIGN PATENTS

| Number | Country | Date |
|---|---|---|
| 180,440 | France | Dec. 22, 1886 |
| 12,117 | Great Britain | 1889 |